US012092451B2

(12) United States Patent
Zaruba

(10) Patent No.: US 12,092,451 B2
(45) Date of Patent: Sep. 17, 2024

(54) SYSTEMS, DEVICES, AND METHODS FOR MAGNETIC POSITION SENSING

(71) Applicant: Infineon Technologies AG, Neubiberg (DE)

(72) Inventor: Sigmund Zaruba, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 66 days.

(21) Appl. No.: 17/864,793

(22) Filed: Jul. 14, 2022

(65) Prior Publication Data
US 2023/0023929 A1 Jan. 26, 2023

(30) Foreign Application Priority Data
Jul. 15, 2021 (DE) .......................... 102021118347.2

(51) Int. Cl.
*G01B 7/00* (2006.01)
(52) U.S. Cl.
CPC .................................... *G01B 7/003* (2013.01)
(58) Field of Classification Search
CPC ............................... G01D 5/145; G01B 7/003
See application file for complete search history.

(56) References Cited

U.S. PATENT DOCUMENTS

| | | | | |
|---|---|---|---|---|
| 2008/0218160 A1* | 9/2008 | Tsuchida | .............. | H02K 11/215 |
| | | | | 74/425.5 |
| 2016/0061630 A1* | 3/2016 | Ausserlechner | ....... | G01D 5/145 |
| | | | | 324/207.21 |
| 2020/0149925 A1* | 5/2020 | Bidaux | ................ | G01R 33/022 |
| 2021/0199730 A1* | 7/2021 | Close | .................. | G01R 33/038 |
| 2021/0348945 A1* | 11/2021 | Bidaux | ................ | H01F 7/0294 |

FOREIGN PATENT DOCUMENTS

DE 102012202404 A1 8/2013

* cited by examiner

*Primary Examiner* — Eman A Alkafawi
*Assistant Examiner* — Suresh K Rajaputra
(74) *Attorney, Agent, or Firm* — Harrity & Harrity, LLP

(57) ABSTRACT

A sensor arrangement includes a ring magnet linearly displaceable along its vertical axis of the ring magnet and including an outer ring section of a first pole pair, an inner ring section of a second pole pair. At least one magnetic sensor circuitry is positioned a non-centered offset distance apart from the ring magnet in a plane perpendicular to the ring magnet's vertical axis. The at least one magnetic sensor can generate spatial magnetic data produced by linear displacement of the ring magnet. A computing unit coupled to the at least one magnetic sensor circuitry and configured to obtain the spatial magnetic data and to determine amount of displacement of the ring magnet after a linear displacement of the ring magnet based on the obtained spatial magnetic data.

20 Claims, 8 Drawing Sheets

SYSTEMS, DEVICES, AND METHODS FOR MAGNETIC POSITION SENSING

FIELD

Various embodiments generally relate to magnetic position sensing sensor systems.

BACKGROUND

Currently in many movement sensing devices, the determination of a position requires burdensome calculations or determinations, which can thus require greater processing power and overhead to implement. For example, many position sensing applications may require the use of circular or trigonometric functions for position determination which require more processing than simpler basic arithmetic operations such as addition, subtraction, multiplication, and division.

SUMMARY

Embodiments provide a sensor arrangement including a ring magnet rotatable about its vertical axis and configured to displace linearly in a direction along the vertical axis of the ring magnet. The ring magnet further including: an outer ring section providing a first pole pair; an inner ring section providing a second pole pair, the second pole pair being opposite in polarity to the first pole pair; at least one magnetic sensor circuitry positioned a non-centered offset distance apart from the ring magnet in a plane perpendicular to the vertical axis, the at least one magnetic sensor circuitry configured to generate spatial magnetic data from one or more magnetic fields produced by linear displacement of the ring magnet; and at least one computing unit including at least one processor operably coupled to the at least one magnetic sensor circuitry and configured to obtain the spatial magnetic data and to determine displacement position data of the ring magnet after a linear displacement of the ring magnet based on the obtained spatial magnetic data.

Embodiments further provide a method for determining linear displacement of a ring magnet. The method includes obtaining magnetic fields at least one magnetic sensor circuitry from the linearly displaced ring magnet, the at least one magnetic sensor circuitry located at fixed offset from the linear displacement the ring magnet; determining a first magnetic field component in a first direction along or parallel to the movement direction of the ring magnet and a second magnetic field component in a second direction perpendicular to the first direction, by the at least one magnetic sensor circuitry from the obtained magnetic fields; determining a ratio of the first magnetic field component to the second magnetic field component; and determining a position of the linearly displaced ring magnet based on the determined ratio.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which.

DETAILED DESCRIPTION

Figure 1A:
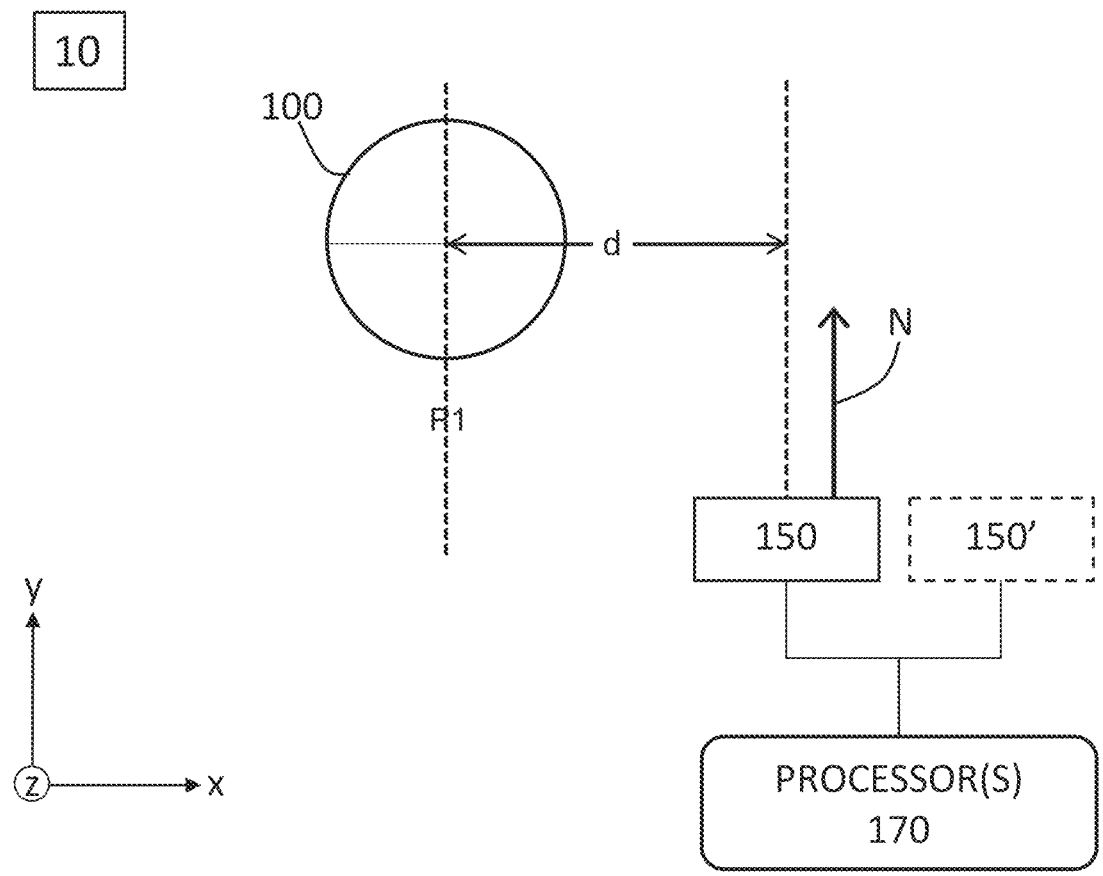
FIGS. 1A-1C include a diagram illustrating a sensor arrangement according to at least one exemplary embodiment of the present disclosure.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [ . . . ], etc.).

As used herein, unless otherwise specified, the use of the ordinal adjectives "first", "second", "third", etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "controller" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computer Unit (NCU), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit.

As utilized herein, terms "module", "component," "system," "circuit," "element," "interface," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure may be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

Further, spatially relative terms, such as "beneath," "below," "lower," "above," "upper" and the like, may be used herein for ease of description to describe one element or feature's relationship to another element(s) or feature(s)

as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "semiconductor substrate" or "semiconductor die" is defined to mean any construction comprising semiconductor material, for example, a silicon substrate with or without an epitaxial layer, a silicon-on-insulator substrate containing a buried insulator layer, or a substrate with a silicon germanium layer. The term "integrated circuits" as used herein refers to electronic circuits having multiple individual circuit elements, such as transistors, diodes, resistors, capacitors, inductors, and other active and passive semiconductor devices. A conductive region formed in and/or on the semiconductor substrate or semiconductor die is a portion of conductive routes and has exposed surfaces that may be treated by a planarization process, such as chemical mechanical polishing. Suitable materials for the conductive regions may include, but not limited to, for example copper, aluminum, copper alloy, or other mobile conductive materials. Copper interconnect level may be the first or any subsequent metal interconnect level of the semiconductor device.

Figure 1B:
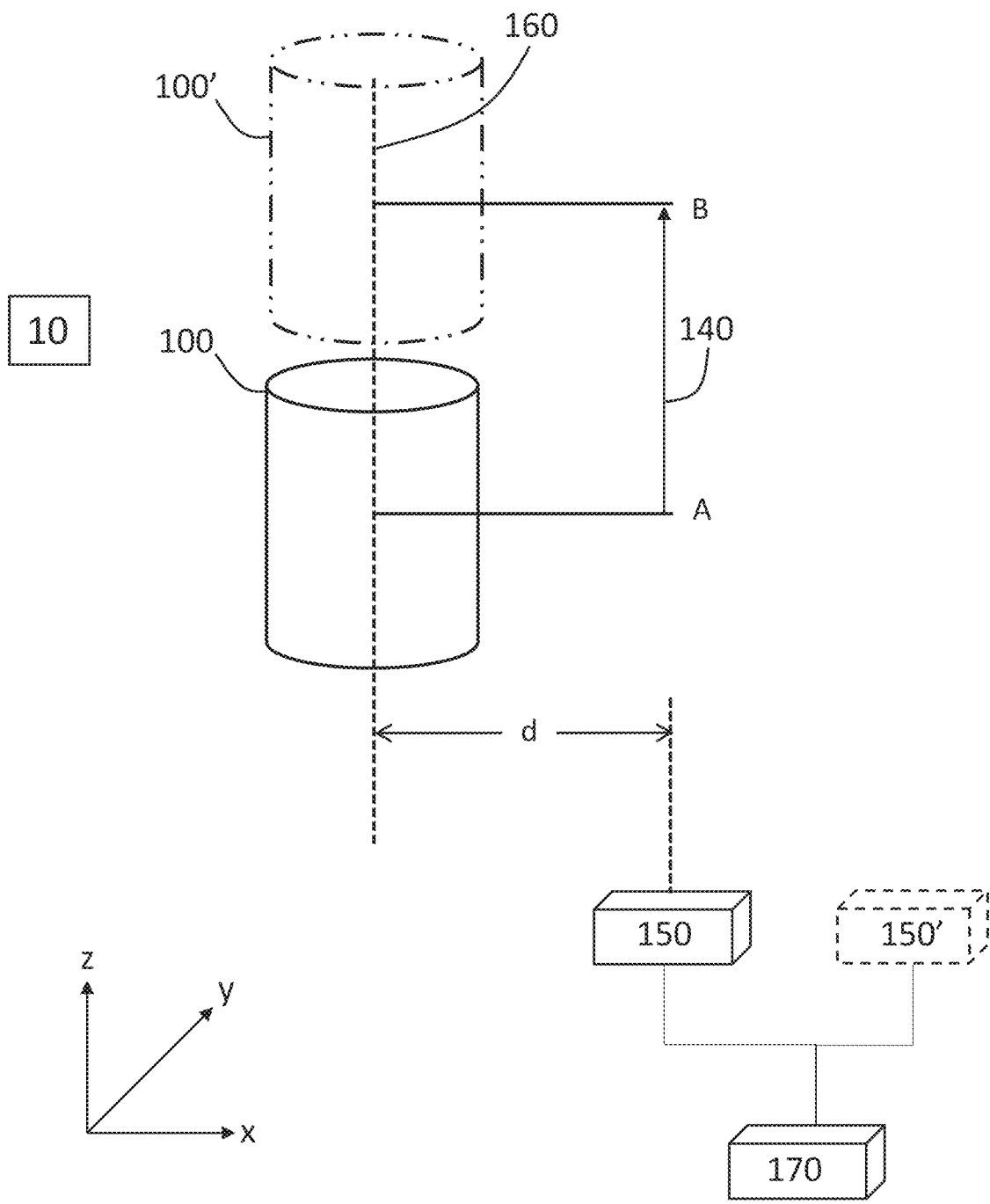

FIGS. 1A-1B include a diagram illustrating a sensor arrangement 10. FIG. 1A if a top view of the sensor arrangement 10 and FIG. 1B is a corresponding front perspective view. The figures shown show a local coordinate system in which x, y, and z directions can correspond to the local XYZ coordinate system, where the x, y, z directions are perpendicular to each other.

The sensor arrangement 10 includes a ring magnet 100. The ring magnet 100 may be linearly displaceable along a linear or straight line path 160. That is, the ring magnet 100 may be only displaceable along one dimension, which in various embodiments described herein is path in a direction along a vertical axis of the ring magnet 100. As shown in FIG. 1B, the ring magnet 100 moving in the path 160 is in the z-direction (e.g. parallel to local z-axis) or along the vertical axis of the ring magnet 100.

The ring magnet 100 can generate magnetic fields while moving or displacing. In the example of FIG. 1B, the ring magnet 100 linearly moves or displaces from point or position or elevation A to position or elevation B as measured, in this example, from a midpoint of the ring magnet 100. The ring magnet 100' represents the ring magnet 100 after displaced to position B.

The sensor arrangement 10 includes at least one magnetic sensor circuitry 150. In some embodiments, the sensor arrangement 10 may include only one magnetic sensor circuitries 150 (referred to in the singular or plurality as magnetic sensor circuitry 150). The magnetic sensor circuitry 150 can be configured to determine magnetic field components of received magnetic signals. In one example, the at least one magnetic sensor 150 may be or include a Hall sensor, an Anisotropic Magneto-Resistance (AMR), a Giant Magneto-Resistance (GMR), and/or a Tunnel Magneto-Resistance (TMR), to name a few.

The magnetic sensor circuitry 150 can be located at a fixed distance or offset from the ring magnet 100. More specifically, the center or other arbitrary point of the magnetic sensor 150 can be a fixed distance from the center or other arbitrary point of the ring magnet 100 can traverse. From the top view shown in FIG. 1A, within the local XY plane, the magnetic sensor circuitry 150 is placed apart from the ring magnet 100 in two dimensions, along the x-direction, and y-direction. The local XY plane is a plane perpendicular to the movement direction of the ring magnet 100. The horizontal offset d may be measured from the center magnetic sensor circuitry 150 along the (local) x-direction which can also be considered the offset or horizontal offset direction.

In embodiments herein, with respect to an XY-plane perpendicular the vertical axis/movement direction, the magnetic sensor circuitry 150 may be at any suitable or arbitrary position along a fixed line spaced part (along y-direction) from the ring magnet 100. The horizontal offset distance is the distance along this (virtual) fixed line (e.g., along x-direction) from a position where magnetic sensor circuitry 150 is located to a second position that is only separated from the ring magnet 100 by a perpendicular distance between the ring magnet and the fixed line. This second position can be considered as a "centered position" which is only apart from the ring magnet in one direction, e.g., along the local y-direction.

In cases, where with offset (horizontal offset), the magnetic sensor circuitry 150, with no tilt/rotation, would be centered and would face the ring magnet 100 and would only be spaced apart from the ring magnet 100 in one direction (e.g., the y-direction). In this case, the magnetic sensor circuitry 150 is decentered with a fixed offset (along x-direction) respect to the ring magnet 100.

In general, the magnetic sensor circuitry 150 may be defined by its orientation or tilt, and in particular its orientation or tilt with respect to the ring magnet 100 in various embodiments herein. The tilt of the magnetic sensor circuitry 150 may be defined by the angle the magnetic sensor faces with respect to the ring magnet 100.

In FIGS. 1A and 1B, the magnetic sensor circuitry 150 is oriented or tilted to face in one direction of offset with respect to the ring magnet 100. That is the magnetic sensor circuitry 150 faces along the y-axis, or y-direction. Said differently, the tilt, $\theta$, of the magnetic sensor circuitry 150 in FIGS. 1A and 1B is zero degrees (0°). If there was no horizontal offset d, the magnetic sensor circuitry 150 would be centered and would directly face the ring magnet 100. The tilt $\theta$ can be measured as the angle between the facing direction or normal direction N of the magnetic sensor 150 to the local y-axis. Further, in such cases of zero-degree tilt, the magnetic sensor circuitry 150 may have an extension that is parallel to the x-direction or parallel to the horizontal offset direction.

Figure 1C:
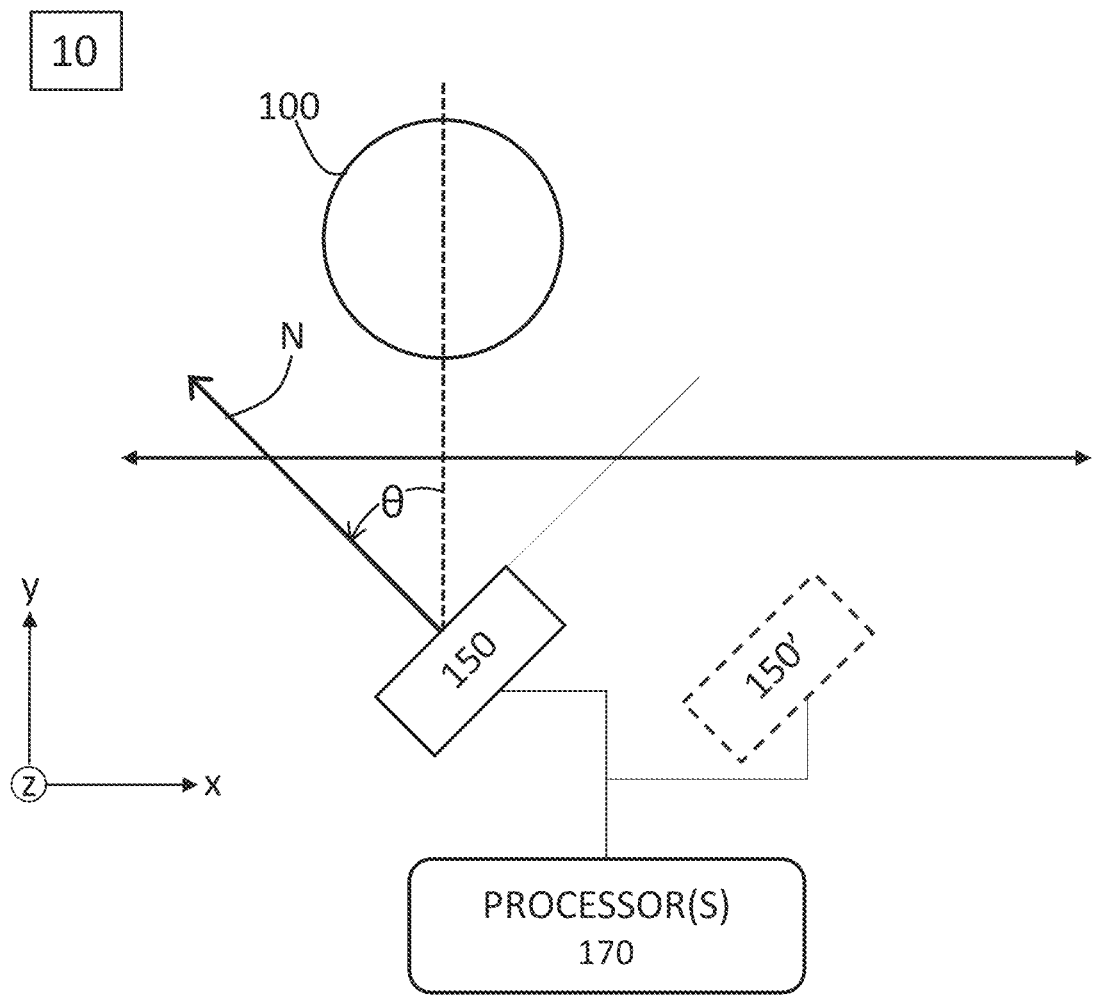

FIG. 1C shows another sensor arrangement 20 according to an exemplary embodiment of the present disclosure. The components may be the same as FIGS. 1A and 1B. In this example the at least one magnetic sensor circuitry 150 is not horizontally offset (e.g., along a local x-direction). Instead, the horizontal offset is zero in this example. In general, when the horizontal offset is zero the magnetic sensor circuitry 150 can be considered as centered with respect to the ring magnet 100.

In other words, the magnetic sensor circuitry 150 may only be spaced apart from the ring magnet 100 in one direction (y-direction), e.g., in the XY-plane.

Further, in this example, the magnetic sensor circuitry 150 is tilted or is rotated, by a non-zero degree. The tilt, θ, in the XY-plane may be an acute angle in some examples e.g., between negative 90 and positive 90 degrees (−90°<θ<90°) or between 0 and 360 degrees. In some examples, the tilt, θ, may be equal or substantially equal to 45 degrees.

In other examples, there may be more than one tilt angle. That is, the at least one magnetic sensor circuitry may be tilted in one, two, or three-dimensions, with corresponding tilt angles being measure, e.g., with respect to the ring magnet 100 or some aspect of the ring magnet.

For such sensor arrangements, (e.g., sensor arrangement 10 or sensor arrangement 20), the magnetic sensor circuitries 150 can receive the magnetic fields generated by the movement or displacement 140 of the ring magnet 100 (along the z-direction/vertical axis direction). The magnetic sensors 150 can detect the generated magnetic fields and can produce magnetic sensor data which includes magnetic spatial data. The spatial magnetic data can include indicating the directional field components of the generated magnetic field.

In the context of FIGS. 1A-1C, the spatial magnetic data can indicate or include a magnetic field component Bx (magnetic field in the x-direction) a magnetic field component By (magnetic field in the y-direction) and a magnetic field component Bz (magnetic field in the z-direction). The x, y, and z-directions can be local/relative to a particular sensor arrangement.

Further, the magnetic sensor circuitry 150 may output one or more signals indicating the magnetic spatial data to the one or more processors 170 of the sensor arrangement 10. The one or more processors 170 can be configured to determine the position of the linearly displaced ring magnet 100 based on the obtained magnetic spatial data. For example, the one or more processors can execute instructions stored on a non-transitory computer readable medium to determine displacement position data indicating the displaced position or amount of linear displacement (e.g., from an initial starting or resting position) for the ring magnet 100.

In various examples herein, the ring magnet 100 may reside or be housed in a structure to allow the ring magnet to move or displace appropriately. Such a structure may be any suitable arrangement or construction that can allow or guide the ring magnet 100 to only displace along its vertical axis.

Due to the configuration of the ring magnet 100 (described later), the position of the ring magnet 100 can be proportional to the magnetic field components or to a pair of magnetic field components. In other words, in the context of FIGS. 1A-1C, where the ring magnet 100 moves along its vertical axis (e.g., along z-axis), and the sensors are positioned at certain offset horizontal distances (along the x-direction) from the magnetic ring 100, the relationship between the position of the displaced ring magnet 100 and the magnetic field components can be expressed as:

$$P2 = k * \frac{Bz}{Bx} + z_0$$

where

P2 is the displaced position of the ring magnet,
k is a constant
$z_0$ is initial position (in z-direction)
Bx is the magnetic field component along the x-direction (perpendicular to ring magnet movement direction)
Bz is the magnetic field component along the z-direction (along the vertical axis or along the ring magnet movement direction and perpendicular to x-direction)

As described, the at least one magnetic sensor circuitry 150 may be tilted. Depending on how it is tilted, a different ratio of magnetic field components may be used to determine the position or amount of displacement of the ring magnet 100. For example, instead of $$\frac{Bz}{Bx},$$

the ratio of $$\frac{Bz}{By}$$

may be used. In the case where the magnetic sensor circuitry 150 is only tilted in the local xy-plane (plane perpendicular to the magnet ring movement direction) then the ratio $$\frac{Bz}{Bx}$$

can be used.

As shown in FIGS. 1A and 1B, the sensor arrangement 10 may include at least one two magnetic sensor circuitries, 150 and 150'. The at least one second magnetic sensor 510' may be similar to the at least first magnetic sensor 510. Both the first magnetic sensor(s) 150 and the second magnetic sensor(s) 150' may detect magnetic fields produced by the ring magnet 100 and output signals to the at least one processor 170 indicating the magnetic spatial data of the magnetic fields. The processor 170 can use magnetic spatial data (e.g., magnetic field component data) input from both the at least one first magnetic sensor 150 and the at least one second magnetic sensor 150'.

The stray field robust data or stray robust magnetic data is similar to the spatial magnetic data, e.g., including magnetic field components, except that the effect or influence of stray magnetic fields can be eliminated or reduced. That is, the use of redundant or duplicative magnetic sensors can be used or combined to eliminate or reduce the stray magnetic field. Further, the processor 170 can then use the stray field robust data to determine or calculate the position of the linear displaced ring magnet 100 as previously described, e.g., using the ratio between a vertical direction (z-direction or vertical axis direction) to an one in-plane (e.g., x-direction) magnetic component as indicated in the stray field robust data.

Figure 2:
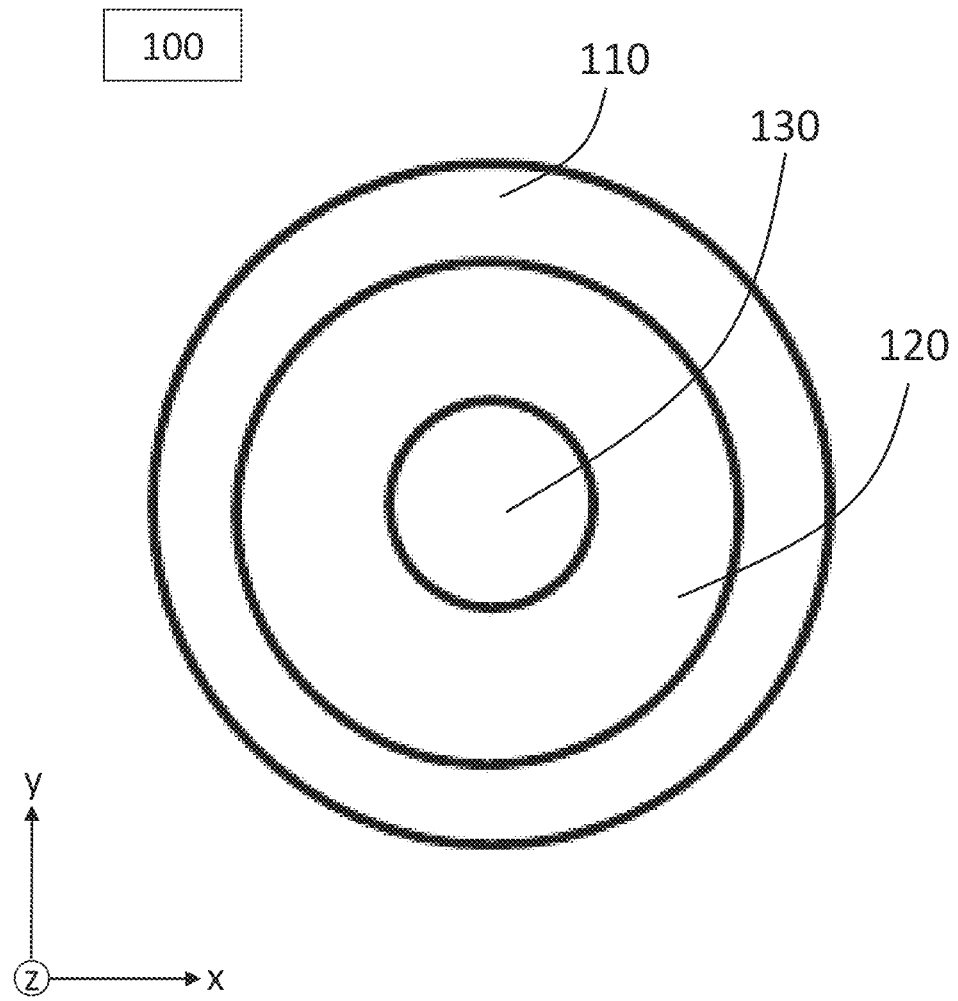
FIG. 2 shows a top cross-section view of the magnetic ring according to at least one exemplary embodiment of the present disclosure.

FIG. 2 shows a top cross-section view of the magnetic ring 100. The magnetic ring 100 can be cylindrical or have a cylindrical shape. For example, in FIGS. 1A and 1B, the magnetic ring 100 have a right circular cylindrical shape. In general, the ring magnet 100 can a have shape or form that is rotationally symmetric, which can prevent its magnetic field from being favored or biased in any one or particular direction.

As shown in the example of FIG. 2, the ring magnet 100 can include an outer ring section 110 and inner ring section 120. The outer ring section 110 and inner ring section 120 may each be ringed shape from the top perspective, with the inner ring section 120 nested within the outer ring section 110. Further, the outer ring section 110 and the inner ring section 120 can each be pole pairs of the ring magnet 100. That is, the outer ring section 110 can be a north pole and the inner ring section 120 can be a south pole, or vice versa.

Further, in embodiment such as or similar to the one shown in FIG. 2, the ring magnet 100 may include a vertical hole, which can extend partially or be a through hole that extends completely through the ring magnet 100. In other cases, the area 130 may be a core section filled with any suitable core material.

Figure 3:
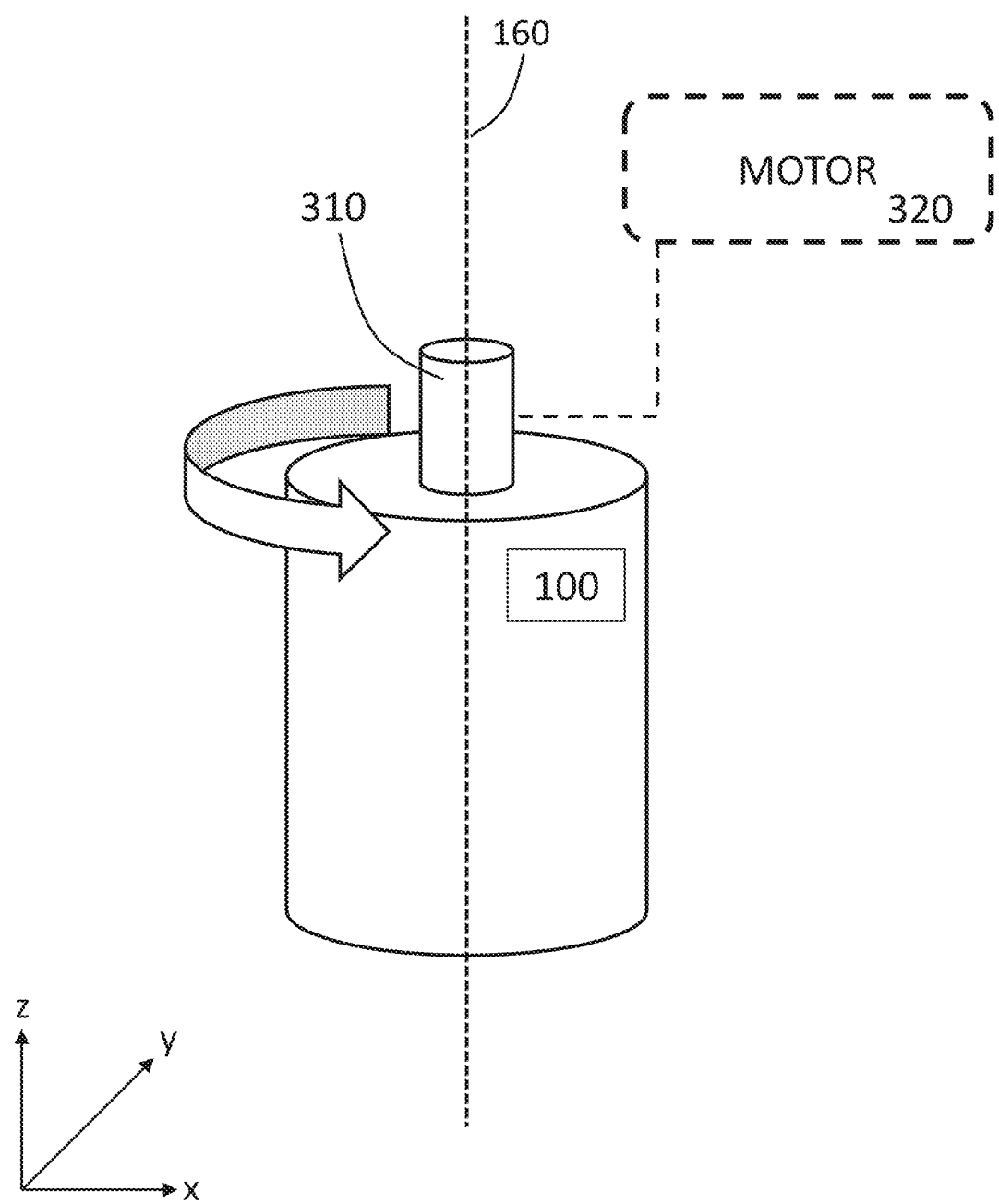
FIG. 3 shows a view of a ring magnet with an axle according to at least one exemplary embodiment of the present disclosure.

In cases, where the section 130 represents a vertical hole for the ring magnet 100, a shaft or axle may be inserted in the vertical hole 130 of the ring magnet. This is shown in FIG. 3, where an axle 310 is shown at least partially inserted into hole 130 of the ring magnet 100.

In some instances, the ring magnet 100 is rotatable. That is, the ring magnet 100 may be free to rotate with respect its vertical axis and around the axle 310. In other examples, the ring magnet 100 may not be rotatable or remain rotationally static before or during linear displacement. In the case where the ring magnet 100 is rotatable, the ring magnet 100 may rotate occur before and/or during a linear displacement of the ring magnet 100.

In another example, the axle 310 may engage the ring magnet 100. That is, the axle 310 may engage (e.g., through friction or other means) the inner surface of the vertical hole of the ring magnet. Thus, when the axle 310 rotates or spins it can cause the ring magnet also to rotate with the axle 310. In example, a motor 320 may be coupled to the axle 310 to cause the axle and therefore cause the ring magnet 100 to rotate with the axle 310.

Figure 4:
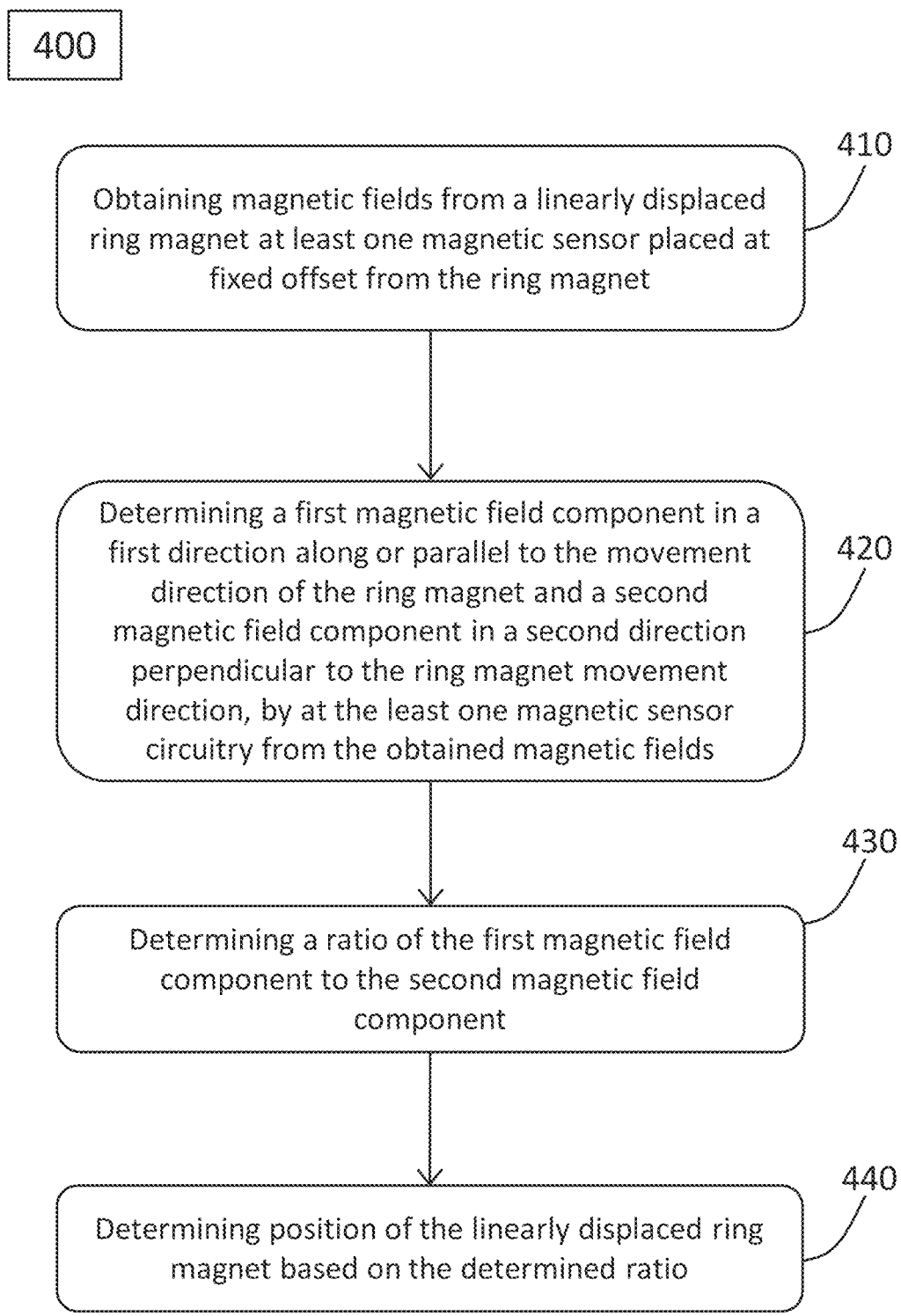
FIG. 4 shows a method 400 according to at least one exemplary embodiment of the present disclosure.

FIG. 4 shows a method 400 according to at least one exemplary embodiment of the present disclosure. The method 400 can be a way to determine the position of a linear displaced magnet, including, in particular the ring magnet 100 described in various embodiments herein.

The method 400 includes at 410, obtaining or receiving magnetic fields from a linearly displaced ring magnet at one or more magnetic sensors placed at fixed perpendicular offset(s) or distance(s) from the ring magnet. At 420, the method includes determining a first magnetic field component in a first direction along or parallel to the displacement or movement direction of the ring magnet and a second magnetic field component in a second direction perpendicular to the displacement or movement direction of the ring magnet or perpendicular to the first direction, by at least one magnetic sensor circuitry from the obtained magnetic fields.

In various examples, this first direction may be along a direction along or parallel to a vertical axis of the ring magnet. The second direction may be along a direction in which the one or more magnetic sensors are displaced, e.g., in a plane perpendicular to the ring magnet movement direction. The second direction can be an offset direction or a direction in which the at least one magnetic sensor circuitry is displaced away from ring magnet.

The method at 430 includes determining a ratio of the first magnetic field component to the second magnetic field component. At 440, the method includes determining a position or an amount of displacement of the linearly displaced ring magnet based on the determined ratio.

Figure 5:
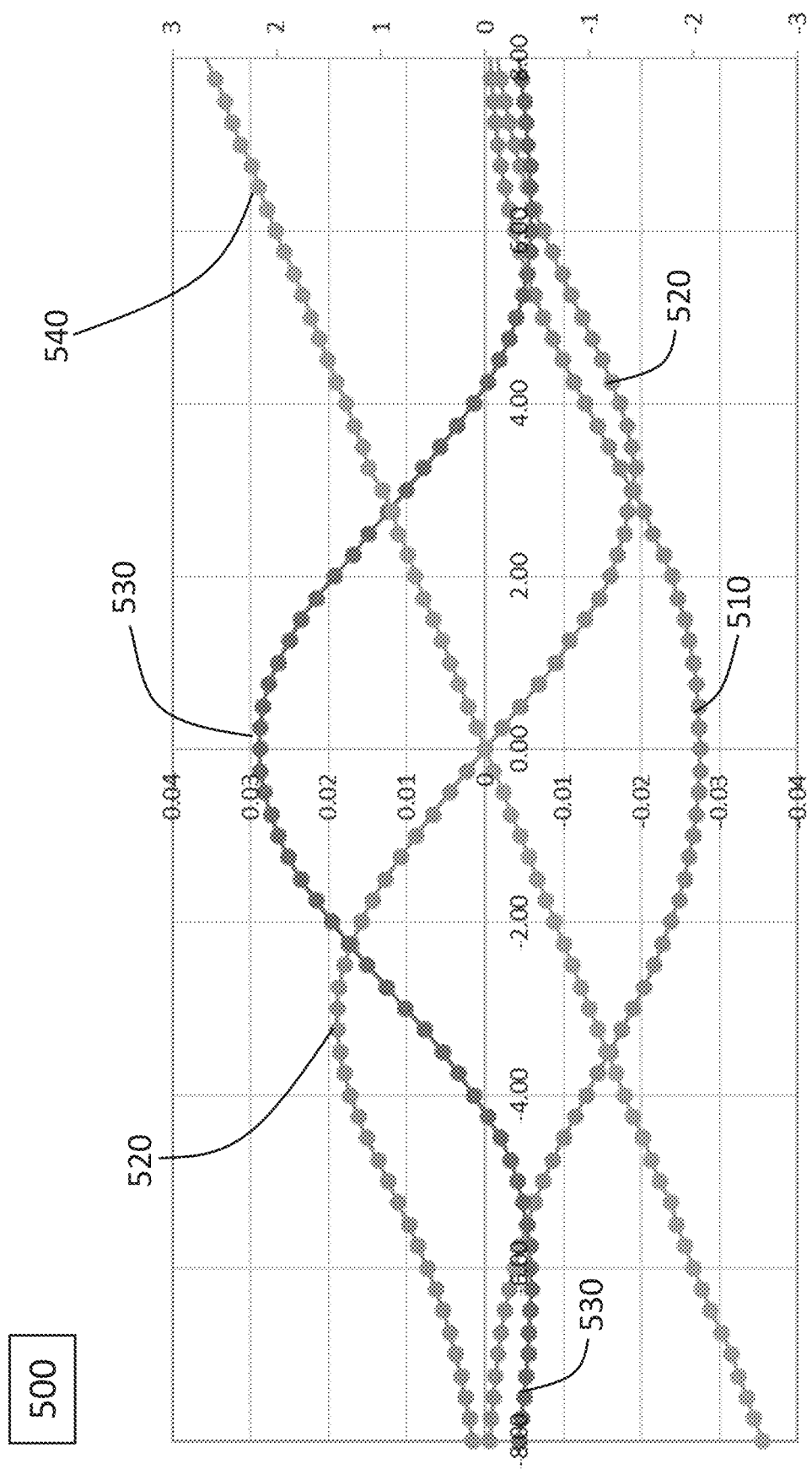
FIGS. 5 and 6 each include a graph including plots of exemplary magnetic spatial data and calculations of magnetic spatial data according to at least one exemplary embodiment of the present disclosure.

FIG. 5 shows a graph 500 showing a plot of exemplary magnetic spatial data, e.g., exemplary magnetic field components captured by one or more magnetic field sensors. The graph 500 also includes a plot of a calculation based on magnetic spatial data.

The plot 510 represents the captured magnetic field along a local x-direction (Bx) which can be a direction perpendicular to the movement of the ring magnet. The plot 520 represents the captured magnetic field component in the local z-direction (Bz), which can be a direction perpendicular to the ring magnet movement direction. The plot 530 represents the captured magnetic field component along the y-direction (By) or in a second direction perpendicular to the ring movement direction and perpendicular to the first direction. As in other embodiments, the x, y, and z directions can correspond to a standard and local XYZ coordinate system, e.g., where the x, y, z directions are perpendicular to each other.

The x-axis of the plot represents position or amount of displacement of the ring magnet 100 in units of mm. In this example, the ring magnet travels or moves from a position of −8.0 to 8 mm. The values of center y-axis are the absolute values of a magnetic field component in Milliteslas (mT).

The plot 540 represents the ratio of the captured z-direction magnetic component divided by the corresponding x-direction magnetic field component. Expressed differently, the line 540 is $$\frac{Bz}{Bx}.$$

The rightmost y-axis axis includes unitless values. As graph 500 shows, the curve 540 shows a linear relationship between the position and the ratio $$\frac{Bz}{Bx}.$$

As described in embodiments of the present disclosure, the at least one magnetic sensor is positioned at a perpendicular offset from the path or line of travel of the ring magnet. Introducing the offset by centering the magnetic sensor circuitry assures that the magnetic field component in an offset or horizontal direction (e.g., local x-direction) will be non-zero. In other embodiments, there may not be an offset in the horizontal direction (e.g., local x-direction) but the magnetic sensor circuitry can be tilted, e.g., with respect to the ring magnet. In other words, in this case the magnetic sensor circuitry may be centered but tilted.

In both scenarios, dividing the magnetic field component in a ring magnet movement direction (e.g., z-direction in FIGS. 1A and 1B) by the magnetic field in a horizontal offset direction (e.g., x-direction in FIGS. 1A and 1B) can provide a value proportional to the amount or length of displacement of the ring magnet. In other words, the division of these magnetic field components can provide a slope of a linear equation defining the position of linear displaced magnet.

Figure 6:
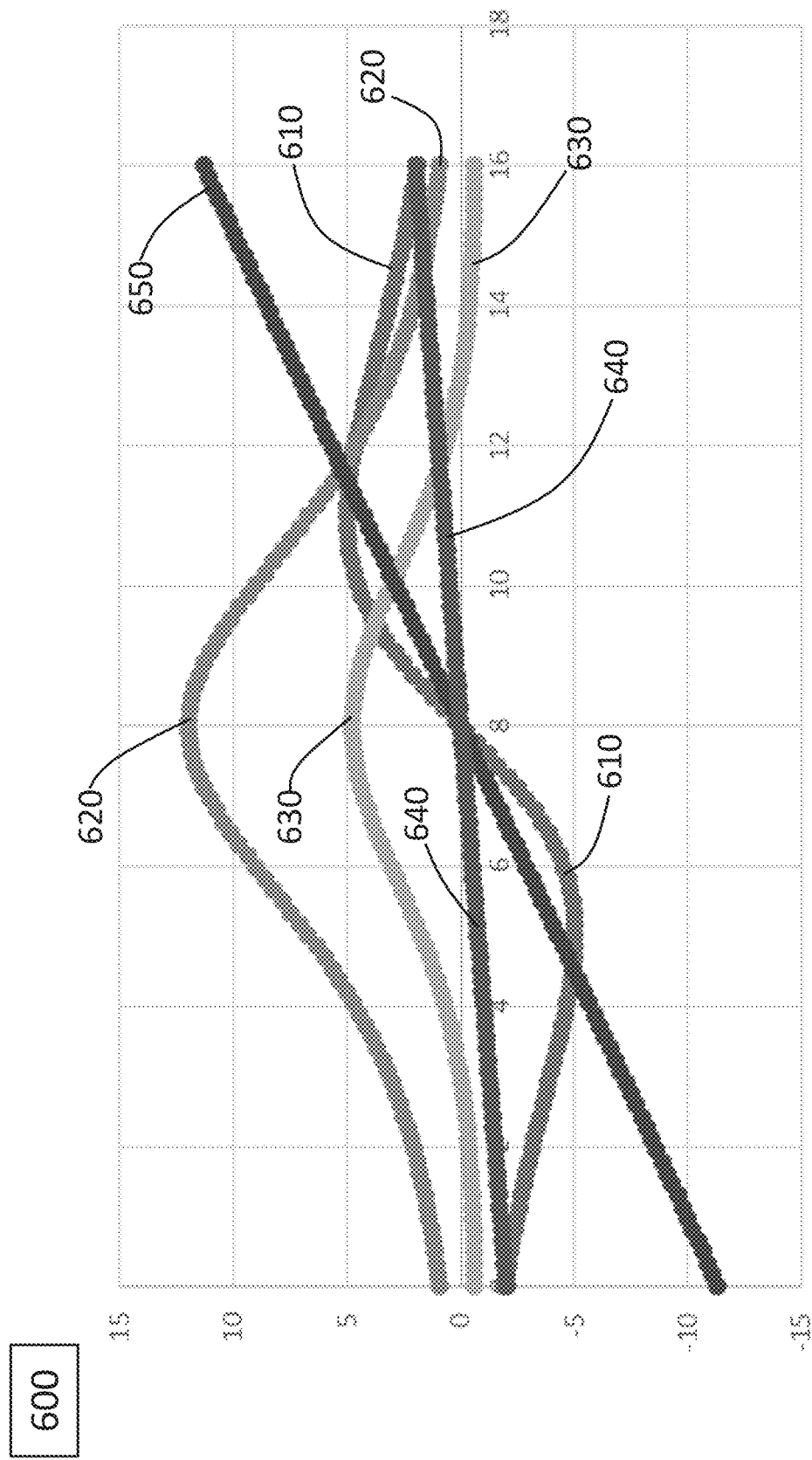

FIG. 6 includes a graph 600 including plots of exemplary magnetic spatial data and plots of magnetic field calculations using the magnetic spatial data. The magnetic spatial data can have been captured from an exemplary ring magnet displaced in a movement direction, the vertical axis or the z-direction with respect to a local XYZ coordinate system.

The plots can include exemplary magnetic field components that may be captured by one or more magnetic field sensors. The plots can represent exemplary captured magnetic fields along directions of the local coordinate system. The plot 610 represents an exemplary magnetic field captured be along an z-direction (Bz) which can be a direction along or parallel to the ring movement direction or vertical axis direction. The plot 620 represents exemplary captured magnetic field component in the x-direction (Bx), which can be a horizontal offset direction. The plot 630 represents exemplary a captured magnetic field component in the y-direction (By), another offset direction.

The plot 640 can represent the plot of the ratio of the magnetic field component in the first direction (Bz) to the magnetic field component in the second direction (Bx). The plot 650 can represent the plot of the inverse tangent function (arctan) of the ratio of the magnetic field component in the first direction (Bz) to the magnetic field component in the second direction (Bx).

As in FIG. 6, both the plots of the ratio 640 and the plot of the inverse tangent function (arctan) of the ratio each have a linear relationship with the displaced position of the ring magnet. Accordingly, instead of using the arctan function, use of the ratio of magnetic field component in the movement direction to the magnetic field in the offset direction can be used to provide displace position with more computation ease or efficiency.

The following examples pertain to further aspects of this disclosure:

Example 1 is a sensor arrangement including a ring magnet rotatable about its vertical axis and configured to displace linearly along the vertical axis of the ring magnet, the ring magnet further including: an outer ring section providing a first pole pair; an inner ring section providing a second pole pair, the second pole pair being opposite in polarity to the first pole pair; at least one magnetic sensor circuitry positioned an non-centered offset distance apart from the ring magnet in a plane perpendicular to the vertical axis, the at least one magnetic sensor circuitry configured to generate spatial magnetic data from one or more magnetic fields produced by linear displacement of the ring magnet; and at least one computing unit comprising at least one processor operably coupled to the at least one magnetic sensor circuitry and configured to obtain the spatial magnetic data and to determine displacement position data of the ring magnet after a linear displacement of the ring magnet based on the obtained spatial magnetic data.

Example 2 is the subject matter of Example 1, wherein the ring magnet can have a cylindrical shape.

Example 3 is the subject matter of Example 1 or 2, wherein the spatial magnetic data can include a first magnetic spatial component and a second magnetic spatial component, and wherein the at least one processor can be configured to determine the displacement position data of the displaced cylindrical ring magnet based on a ratio between the first magnetic spatial component and the second magnetic spatial component.

Example 4 is the subject matter of Example 3, wherein the first magnetic spatial component can be a magnetic component along or parallel to a ring magnet movement direction and the second magnetic spatial component can be a magnetic component along an offset direction in which the at least one magnetic sensor is spaced apart from the ring magnet and perpendicular to the ring magnet movement direction.

Example 5 is the subject matter of any of Examples 1 to 4, wherein the at least one magnetic sensor circuitry can have a zero tilt with respect to the ring magnet, the zero tilt being in a plane perpendicular the vertical axis of the ring magnet.

Example 6 is the subject matter of any of Examples 1 to 5, wherein the ring magnetic may surround a vertical hole coincident with the vertical axis of the ring magnet.

Example 7 is the subject matter of Example 6, wherein the vertical hole can extend completely through the ring magnet.

Example 8 is the subject matter of Example 7, which may further include: an axle disposed at least partially within the vertical hole of the cylindrical ring magnet.

Example 9 is the subject matter of Example 8, wherein the cylindrical ring magnetic can be rotatable around the axle.

Example 10 is the subject matter of Example 8, wherein the axle can be configured to engage the cylindrical ring magnet so as to cause the cylindrical ring magnet to rotate as the axle rotates.

Example 11 is the subject matter of Example 10, which may further include: a motor mechanically coupled to the axle and configured to cause the axle and the ring magnetic to rotate.

Example 12 is the subject matter of any of Examples 1 to 11, wherein the inner ring section of the ring magnetic can be concentrically nested inside the outer ring section of the ring magnet.

Example 13. The sensor arrangement of any of claims 1 to 12, wherein the at least one magnetic sensor circuitry comprises a first magnetic sensor circuitry and a second magnetic sensor circuitry, the first and second magnetic sensor circuitries each configured to generate spatial magnetic data based on the one or more magnetic fields produced by linear displacement of the cylindrical ring; wherein the computing unit to determine displacement position data of the ring magnet comprises to generate magnetic spatial data using with a reduction or cancellation of magnetic stray field using the obtained spatial magnetic data from the first and second magnetic sensor circuitries.

Example 14 is the subject matter of any of Examples 1 to 12, wherein the computing unit to determine displacement position data of the ring magnet comprises to determine a ratio of magnetic field component in the movement direction of the ring magnetic to the magnetic field component a direction in which the at least one magnetic sensor circuitry is offset to the ring magnet.

Example 15 is a method for determining linear displacement of a ring magnet, the method including: obtaining magnetic fields at least one magnetic sensor circuitry from the linearly displaced ring magnet, the at least one magnetic sensor circuitry located at fixed offset from the linear displacement the ring magnet; determining a first magnetic field component in a first direction along or parallel to the movement direction of the ring magnet and a second magnetic field component in a second direction perpendicular to the movement direction and along or parallel to a direction in which the at least one magnetic sensor circuitry is offset, by the at least one magnetic sensor circuitry from the obtained magnetic fields; determining a ratio of the first magnetic field component to the second magnetic field component in the second direction; and determining a position or amount of linear displacement of the linearly displaced ring magnet based on the determined ratio.

Example 16 is the subject matter of Example 15, wherein the ring magnet can be a cylindrically shaped ring magnet.

Example 17 is the subject matter of Example 15 or 16, wherein the ring magnet can be configured to displace linearly in a direction along a vertical axis of the cylindrical ring magnet.

Example 18 is the subject matter of any of Examples 15 to 17, herein the ring magnet may further include: an outer ring section providing a first pole pair, an inner ring section providing a second pole pair, the second pole pair being opposite in polarity to the first pole pair.

Example 19 is the subject matter of any of Examples 15 to 18, wherein the ring magnetic can rotate during the linear displacement.

Example 19A, is the subject matter of any of Examples 15 to 18, wherein the ring magnet can remain rotationally static during the linear displacement.

Example 20 is the subject matter of any of claims 15 to 19, wherein the at least one magnetic sensor circuitry can include a first magnetic sensor circuitry and a second magnetic sensor circuitry each configured to generate magnetic field component data, and wherein determining the first magnetic field component and the second magnetic field component can include determining the first magnetic field component in the first direction and the second magnetic field component in the second direction with a reduced or eliminated stray field magnetic component.

Example 21 is a sensor arrangement including a ring magnet rotatable about its vertical axis and configured to displace linearly along the vertical axis of the ring magnet, the ring magnet further including: an outer ring section providing a first pole pair, an inner ring section providing a second pole pair, the second pole pair being opposite in polarity to the first pole pair; at least one magnetic sensor circuitry having a non-zero-degree tilt with respect to the ring magnet in a plane perpendicular to the vertical axis of the ring magnet, the at least one magnetic sensor circuitry configured to generate spatial magnetic from one or more magnetic fields produced by linear displacement of the cylindrical ring; the at least magnetic and at least one computing unit comprising at least one processor operably coupled to the at least one magnetic sensor circuitry and configured to obtain the spatial magnetic data and to determine displacement position data of the ring magnet after a linear displacement of the ring magnet based on the obtained spatial magnetic data, wherein the tilt of the at least one magnetic sensor circuitry is measured with respect to an angle the at least one magnetic sensor circuitry faces with respect to the ring magnet.

Example 22 is the subject matter of Example 21, wherein the ring magnet can have a cylindrical shape.

Example 23 is the subject matter of Example 21 or 22, wherein the spatial magnetic data can include a first magnetic spatial component and a second magnetic spatial component, and wherein the at least one processor is configured to determine the displacement position data of the displaced cylindrical ring magnet based on a ratio between the first magnetic spatial component and the second magnetic spatial component.

Example 24 is the subject matter of Example 23, wherein the first magnetic spatial component or second magnetic spatial can be along directions parallel or perpendicular to a movement direction of the ring magnet.

Example 25 is the subject matter of any of Examples 21 to 24, wherein an angle of the tilt of the at least one magnetic sensor circuitry can be an acute angle.

Example 26 is the subject matter of any of Examples 21 to 25, wherein an angle of the tilt of the at least one magnetic sensor circuitry can be an angle substantially equal to 45 degrees.

Example 27 is the subject matter of any of Examples 21 to 24, wherein an angle of the tilt of the at least one magnetic sensor circuitry can be an angle greater than 90 degrees.

It should be noted that one or more of the features of any of the examples above may be suitably or appropriately combined with any one of the other examples.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A sensor arrangement, comprising:
   a ring magnet rotatable about its a vertical axis and configured to be displaced linearly in a movement direction along the vertical axis of the ring magnet, the ring magnet further comprising an outer ring section providing a first pole pair and an inner ring section providing a second pole pair, the second pole pair being opposite in polarity to the first pole pair;
   at least one magnetic sensor circuitry positioned at a non-centered offset distance apart from the ring magnet in a plane perpendicular to the vertical axis, the at least one magnetic sensor circuitry configured to generate spatial magnetic data from one or more magnetic fields produced by a linear displacement of the ring magnet in the movement direction along the vertical axis; and
   at least one processor operably coupled to the at least one magnetic sensor circuitry and configured to obtain the spatial magnetic data and to determine displacement position data of the ring magnet corresponding to the linear displacement of the ring magnet based on the spatial magnetic data.

2. The sensor arrangement of claim 1, wherein the ring magnet has a cylindrical shape.

3. The sensor arrangement of claim 1, wherein:
   the spatial magnetic data comprises a first magnetic spatial component and a second magnetic spatial component, and
   the at least one processor is configured to determine the displacement position data of the ring magnet based on a ratio between the first magnetic spatial component and the second magnetic spatial component.

4. The sensor arrangement of claim 3, wherein the first magnetic spatial component is a magnetic component along or parallel to the movement direction of the ring magnet and the second magnetic spatial component is a magnetic component perpendicular to the movement direction of the ring magnet.

5. The sensor arrangement of claim 1, wherein the at least one magnetic sensor circuitry has zero tilt with respect to the ring magnet.

6. The sensor arrangement of claim 1, wherein the ring magnet surrounds a vertical hole coincident with the vertical axis of the ring magnet.

7. The sensor arrangement of claim 6, wherein the vertical hole extends completely through the ring magnet.

8. The sensor arrangement of claim 7, further comprising:
   an axle disposed at least partially within the vertical hole of the ring magnet.

9. The sensor arrangement of claim 8, wherein the ring magnet is rotatable around the axle.

10. The sensor arrangement of claim 8, wherein the axle is configured to engage the ring magnet so as to cause the ring magnet to rotate as the axle rotates.

11. The sensor arrangement of claim 10, further comprising:
a motor mechanically coupled to the axle and configured to cause the axle and the ring magnet to rotate.

12. The sensor arrangement of claim 1, wherein the inner ring section of the ring magnet is concentrically nested inside the outer ring section of the ring magnet.

13. The sensor arrangement of claim 1,
wherein the at least one magnetic sensor circuitry comprises a first magnetic sensor circuitry and a second magnetic sensor circuitry, the first and the second magnetic sensor circuitries each configured to generate spatial magnetic data based on the one or more magnetic fields produced by the linear displacement of the ring magnet, and
wherein the at least one processor is configured to determine the displacement position data of the ring magnet by generating magnetic spatial data having a reduction or a cancellation of a magnetic stray field component using the spatial magnetic data from the first and the second magnetic sensor circuitries.

14. The sensor arrangement of claim 1, wherein the at least one processor is configured to determine the displacement position data of the ring magnet by determining a ratio of a magnetic field component parallel to the movement direction of the ring magnet to a magnetic field component parallel to a direction in which the at least one magnetic sensor circuitry is offset to the ring magnet.

15. A method for determining a linear displacement of a ring magnet, wherein the linear displacement is provided in a movement direction along a vertical axis of the ring magnet, and wherein the ring magnet is rotationally symmetric about the vertical axis, the method comprising:
obtaining magnetic fields by at least one magnetic sensor circuitry from the ring magnet, the at least one magnetic sensor circuitry being located at a fixed offset from the vertical axis of the ring magnet in a plane perpendicular to the vertical axis;
determining, by the at least one magnetic sensor circuitry from the magnetic fields, a first magnetic field component in a first direction along or parallel to the movement direction of the ring magnet and a second magnetic field component in a second direction perpendicular to the first direction;
determining a ratio of the first magnetic field component to the second magnetic field component; and
determining a position of the ring magnet corresponding to the linear displacement based on the ratio.

16. The method of claim 15, wherein the ring magnet further comprises:
an outer ring section providing a first pole pair; and
an inner ring section providing a second pole pair, the second pole pair being opposite in polarity to the first pole pair.

17. The method of claim 15, wherein the ring magnet rotates about the vertical axis during the linear displacement, and
the first magnetic field component and the second magnetic field component are determined during rotation of the ring magnet.

18. The method of claim 15, wherein:
the at least one magnetic sensor circuitry comprises a first magnetic sensor circuitry and a second magnetic sensor circuitry each configured to generate magnetic field data, and
determining the first magnetic field component and the second magnetic field component comprises determining, based on the magnetic field data from the first magnetic sensor circuitry and the second magnetic sensor circuitry, the first magnetic field component in the first direction and the second magnetic field component in the second direction with a reduced or eliminated stray field magnetic component.

19. The sensor arrangement of claim 1, wherein the spatial magnetic data includes a first value corresponding to a first magnetic field component of the one or more magnetic fields and a second value corresponding to a second magnetic field component of the one or more magnetic fields,
wherein the first magnetic field component is parallel to the movement direction along the vertical axis and the second magnetic field component is perpendicular to the movement direction along the vertical axis, and
wherein the at least one processor is configured to determine the displacement position data of the ring magnet based on a ratio of the first value and the second value.

20. The sensor arrangement of claim 1, wherein the at least one magnetic sensor circuitry is configured to generate the spatial magnetic data during rotation of the ring magnet.

* * * * *

UNITED STATES PATENT AND TRADEMARK OFFICE
CERTIFICATE OF CORRECTION

PATENT NO. : 12,092,451 B2
APPLICATION NO. : 17/864793
DATED : September 17, 2024
INVENTOR(S) : Sigmund Zaruba It is certified that error appears in the above-identified patent and that said Letters Patent is hereby corrected as shown below:

In the Claims

In Claim 1, Column 14, Line 21, "a ring magnet rotatable about its a vertical axis" should be changed to -- a ring magnet rotatable about a vertical axis --.

Signed and Sealed this
Twenty-ninth Day of October, 2024

Katherine Kelly Vidal
*Director of the United States Patent and Trademark Office*